July 18, 1961

G. O. CONNER 2,992,830

CHUCK FOR METAL WORKING MACHINE

Filed March 25, 1958

INVENTOR.
Guy O. Conner
BY W. H. Woodlief
Attorney

July 18, 1961 G. O. CONNER 2,992,830
CHUCK FOR METAL WORKING MACHINE
Filed March 25, 1958 5 Sheets-Sheet 3

INVENTOR.
GUY O. CONNER
BY W. H. Woodlief
ATTORNEY

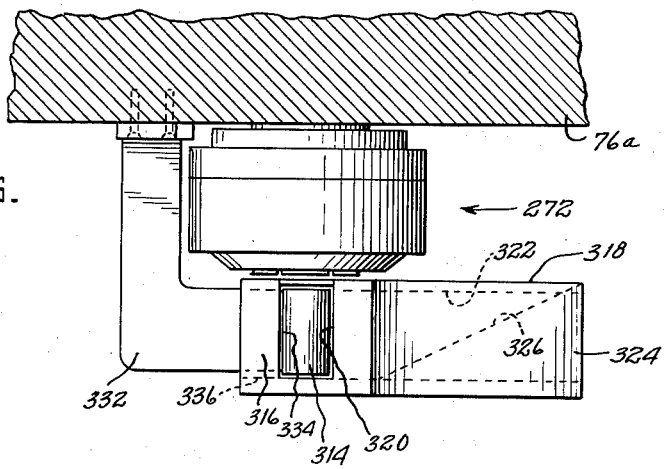
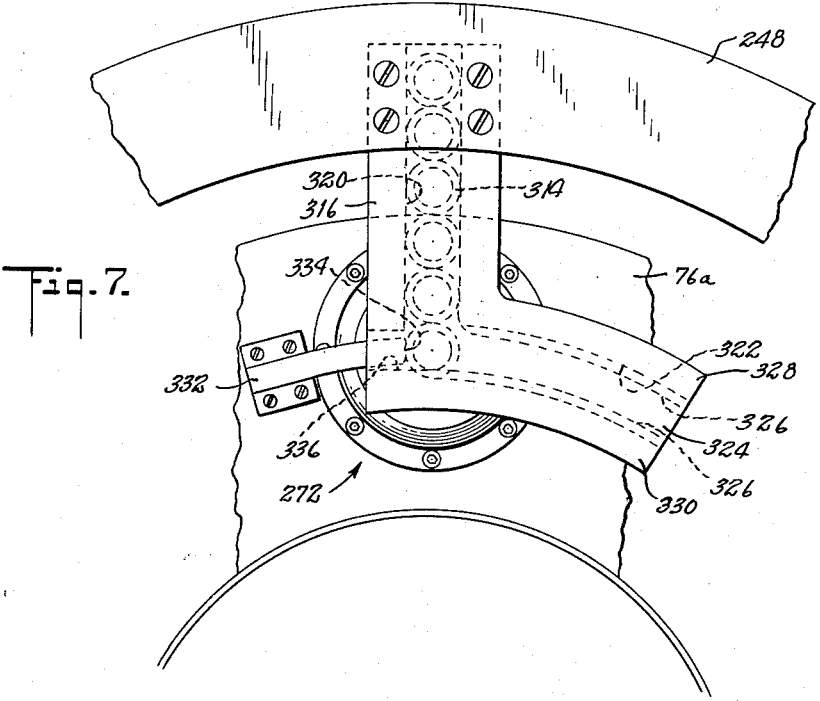

United States Patent Office 2,992,830
Patented July 18, 1961

2,992,830
CHUCK FOR METAL WORKING MACHINE
Guy O. Conner, Cleveland, Ohio, assignor to Republic Steel Corporation, Cleveland, Ohio, a corporation of New Jersey
Filed Mar. 25, 1958, Ser. No. 723,692
11 Claims. (Cl. 279—51)

This invention pertains to improvements in machine tools for forming metal and more particularly to improvements in a machine adapted for high speed performance of a variety of operations such as spinning, tapping, drilling or the like. This application is a continuation-in-part of my pending application for patent, Serial Number 215,131, filed March 12, 1951, for Forming Machine, now Patent No. 2,828,492.

In my aforesaid application for patent, I have disclosed a high speed metal working machine of the automatic screw machine type. The machine of that application is characterized by the provision of a pair of substantially symmetrical drum sections, each of which is adapted to contain a plurality of spindles mounted therein for rotary and longitudinal movement. Each spindle of one drum section is in axial alignment with a corresponding spindle of the opposite drum section to form a spindle pair, and between the confronting spindle ends is located a rotary work holder designed to rotate in unison with the spindle drums, such that work is performed on a workpiece by each spindle pair as the drum sections and the work holder are driven in unison through a revolution by a common axial drive shaft on which the drum sections and the work holder are mounted.

According to my aforesaid application for patent, the confronting ends of the spindles in the opposite drum sections are provided with heads which are designed to grip either a tool for performing the metal forming operation or, in some embodiments, the workpieces on which the forming operation is to be performed. This application concerns itself generally with the particular form and control of the spindle heads.

It is the primary object of this invention to provide improved tool and work holding spindle heads in a machine of the indicated class.

It is a particular object of this invention to provide spindle heads which are operated in a predetermined manner at designated points of the work cycle such that a tool or a workpiece therein may be gripped or released at the proper time.

It is a further object of this invention to provide automatic means in connection with a spindle and its head for releasing a tool or workpiece from the grip of the spindle head and for positively ejecting such tool or workpiece from the head.

These and other objects and advantages of the invention will be clear from a reading of the following specification in light of the drawings in which like reference numerals indicate like parts, and in which:

FIG. 6 is a top plan view of the injector of FIG. 5; and

FIG. 7 is an end-elevational view of the injector.

Figure 1:
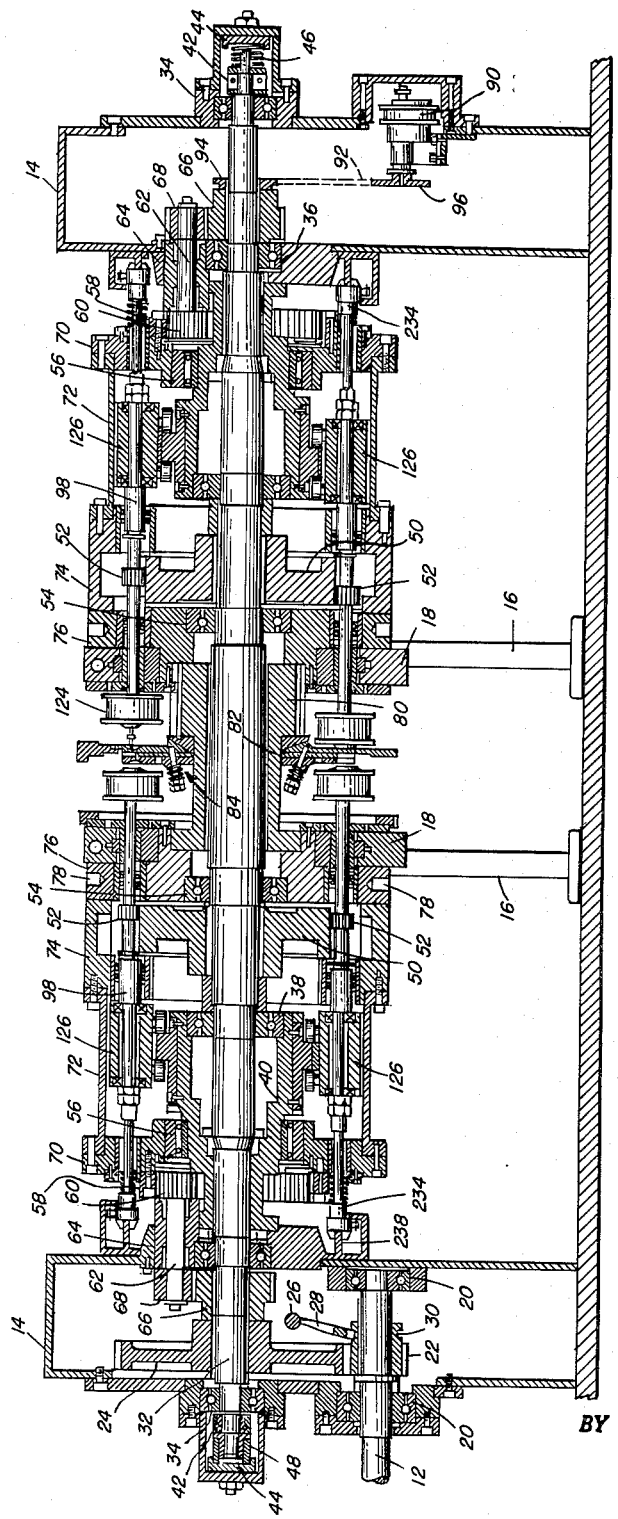
FIG. 1 is a longitudinal medial sectional view through the machine.

Briefly, my invention comprises improvements in an automatic machine having one or more horizontal spindles operated from a central shaft. The spindles, in addition to being rotated about the central axis of the machine, revolve to drive a tool and are moved axially by a stationary cam or similarly actuating mechanisms. The spindles are very accurately and firmly located to avoid misalignment or play. The spindles are arranged around the central axis of the machine in two matched sets, each spindle having an axially aligned, matching spindle facing it from the opposite set. Novel toolholding heads are provided for the spindles. These heads are adapted to hold a tool very firmly yet are able to release the tool to be picked up by the opposite head. Cam operated rods extending through the spindles provide positively operated means for passing the tool from one head to another. The tool must be provided with shanks at both ends of the thread cutting part for the heads to grasp in order for the tool to be passed in this manner. It is conceived, however, that for some operations, the tool will not be passed but that complementary tools may be held by opposing spindles thus performing different types of operation. In one form of the invention a workpiece is held by one of the paired spindle heads and a tool is held by the other head.

In one form of the invention, the center of the machine between the two spindles is occupied by a work holding mechanism adapted to receive a workpiece for each pair of spindles. The work holder securely clamps the workpiece in a fixed position determined by a pilot part of the forming tool and is thus accurately located relative to the spindles. The work holder carries the workpiece along in fixed relation to the spindles, to a discharge point where it is discharged positively from the work holder.

The following more specific description of a principal embodiment of the invention will be made with reference to the drawings and will pertain particularly to the machine as set up to thread nuts. It is not my purpose, however, so to limit my invention as will be made clear by the subsequent description of an alternative use.

With reference to the drawings throughout in which like reference characters are used to designate like parts, I have used the character 10 to designate the base on which the machine is mounted. A main drive motor (not shown) is mounted at one end of the base and is connected to a drive shaft 12 by a suitable coupling. The supporting structure for the machine includes end standards 14 which comprise not only end supports for the machine but also housings for the gear drives and certain auxiliary equipment as will appear later. Auxiliary supports 16 for the center section are also mounted on the base 10. The supports 16 are merely legs carrying guide members 18 whose formation and function will be described hereinafter. When the machine is in operation, suitable covers are employed to enclose the mechanism.

As is best shown in FIG. 1, the drive shaft 12 is journalled in ball bearings 20, in the left hand standard 14. A pinion 22 is mounted on the shaft 12 and is splined thereto such that it may be moved into or out of engagement with a gear 24 by manipulating a lever and associated shifting mechanism. This mechanism is a simple fork shifting arrangement comprising a shaft 26 to which is fixed a shifting fork 28. This fork engages a groove 30 in a collar on the pinion 22 in a manner well known in the art and thus is adapted to shift the pinion into and out of driving engagement with the gear 24.

The drive from the pinion is normally transmitted to the gear 24 and thence to a main drive shaft 32. The shaft 32 is journalled near its end in end bearings 34 in the outer walls of both standards 14 and also in near end bearings 36 in the inner walls. Still further support is provided approximately midway between the center of the shaft and both ends by near center bearings 38 mounted in central stationary members 40. These latter members are bolted or otherwise suitably mounted on the inner walls of the standard 14 at both ends. Thus the shaft is supported by six bearings. Firm support such as this is necessary because the shaft is the sole support of nearly all of the operating mechanism of the machine. Furthermore, such support will help to prevent whipping of the long shaft. A thrust bearing 42 is provided at each end of the shaft. Adjustable cupped members 44 are fixed to the standards 14 and on one end adjust the compressive force of a spring 46. A spacer 48 is substituted for the spring 46 on the other end, but in other respects the devices on both ends are the same.

A pair of large "bull" or sun gears 50 are keyed to the shaft adjacent to and inboard of the near center bearings 38. These gears are the sun gears for two symmetrical planetary gear systems formed by planetary pinions 52 carried about the sun gears 50 by an irregular shaped drum supported partly on the shaft by center bearings 54 and partly on the stationary members 40 by roller bearings 56. This drum is driven from both ends through internal ring gears 58, driven by pinions 60. The pinions 60 in turn are keyed to similar countershafts 62 journalled in bearing brackets 64 mounted on the inner wall of the standards 14. These countershafts 62 are driven by the main shaft 32 through gears 66 keyed to the main shaft and meshing with gears 68 on the countershafts 62.

The main drum is substantially symmetrical end-for-end, except directly at its center. The ring gears 58 are mounted on end plates 70 which also support the roller bearings 56. These end plates 70 are connected to the rest of the drum by cover members 72 which may conveniently be bolted to the end plates 70 and to spindle supporting members 74. The spindle supporting members 74 are fastened to inner wall members 76 on both sides of the center section of the machine. Holes 78 may be provided in the wall member 76 into which a bar may be inserted for turning the machine by hand if desired. The wall members 76 hold the center bearings 54 and so help to support the drum. A center hub 80 joins the wall members from both sides and completes the basic structure of the rotating drum. The hub 80 is the only part of the drum assembly which is not symmetrical, being formed with a shoulder 82 to which a face plate and clamping or work holding mechanism 84 is fastened. A second spindle support member 86 (FIG. 2) may be bolted or otherwise fastened to the wall members 76 on each drum, and a cover plate 88 may be used to cover the complete end of the assembly. The cover 88 and spindle support 86 slide freely relative to the guide member 18 and are particularly useful to provide proper lubrication and flushing of chips.

A small oil pump 90 (FIG. 1) may be mounted in one of the end supports 14 to provide lubrication for the gears and bearings in that support. The pump is driven by a chain 92 engaged with a sprocket 94 on the main shaft and driving a sprocket 96 on the pump shaft. A sump may be formed in the base of the support to catch the oil and supply it to the intake side of the pump 90.

Figure 2:
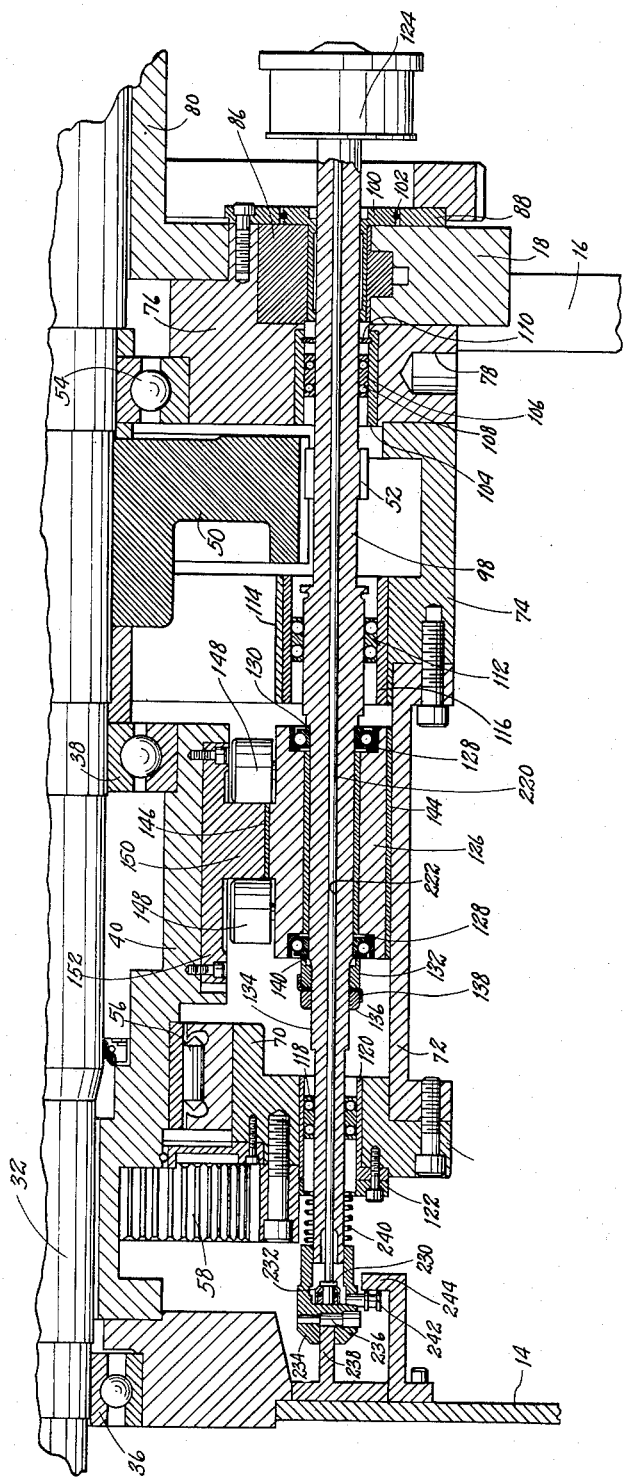
FIG. 2 is an enlarged sectional view of the spindle drive mechanism.

As noted above, the eight spindles 98 on each side of the present embodiment are driven by the meshing engagement of the bull gears 50 with the pinions 52 on the spindles (FIGS. 1 and 2). Each of the spindles is adapted for longitudinal as well as rotary motion, thus being adapted to carry driving heads which drive a tool in a rotary motion while feeding it through a nut blank, or other workpiece, and then following discharge of the finished nut, the heads carried by the spindles return the tool to its original position. It will be apparent that, while the shaft 32 is rotated in one direction, the spindle-carrying drum device will be driven in the opposite direction because of the internal gear drive at the ends of the drum. Thus, the pinions 52 are carried around the bull gears 50 in a planetary manner and consequently are driven at a comparatively high speed. The pinions 52 may be formed as a part of the spindle 98 itself or may be suitably fixed thereto. It will be apparent that the direction of rotation of any or all of the spindles could be reversed by use of an idler gear between the pinion 52 and the bull gear 50. This might be useful in an operation where it was desired that the spindle on one side rotate in a direction opposite to that of the spindles on the other side. As best shown in FIG. 2, the spindle 98 extends through four of the individual members of the rotating drum. At its right hand end in that figure, the spindle is journalled in a bronze bearing bushing 100 pressed into the support member 86. Suitable packing 102 is provided between the cover 88 and the flange of the bushing to keep dirt and chips isolated from the bearings within the drum member, and to keep cutting fluid and the like within the bushing as will appear hereinafter.

The spindle 98 next passes through the end wall member 76. At this point, a hardened steel bushing 104 is pressed into the member. The surface of the spindle adjacent this bushing is also hardened. A form of ball bearing which will journal the shaft both for rotational and longitudinal motion is provided in the space between the bushing and the spindle. This bearing is formed by a sleeve 106 made of brass or similar material and into which two or more circumferential rows of balls 108 are staked in holes formed therein. This assembly of balls and retainer is placed between the bushing 104 and the spindle shaft in that region which then act as races for the ball bearing. It is evident that, in addition to the rotary motion of a regular ball bearing, the spindle can move longitudinally, rolling the balls 108 on the bushing 104 and causing the retainer and ball assembly to move longitudinally one-half the distance moved by the spindle. The bearing is formed so that the balls are preloaded. That is, the diameters of the balls are slightly greater than the space allowed for them between the bushing 104 and the spindle 98. This preload is preferably of the order of .0003 to .0005 inch. A snap ring 110 may be provided for this bearing and may also be used for the others to hold standard oil seal rings in place if desired.

The second and third spindle bearings are similarly formed and preloaded. The second bearing 112 is located in an inwardly extending, wide flange 114 formed in the spindle support member 74. This bearing also includes a hardened bushing 116 pressed into an opening in the flange 114 as a race for the bearing. The third bearing 118 includes a bushing 120 pressed into the end plate 70 and on which the bearing may roll. A cover plate 122 may be provided at this end to protect the bearings and retain grease.

At its end nearest the center of the machine, each spindle carries a tool or work holding spindle head 124 which will be described in more detail hereinafter. The pinion 52 is located between the first and second bearings 106 and 112, and a follower block 126 which controls the longitudinal movement of the spindle is located between the second and third bearings. The spindles are journalled in the follower block by two commercial angular contact ball bearings 128, one at each end of the block. A fixed position of the spindle relative to the block is maintained by engagement of one of the bearings with a shoulder 130 on the spindle against which the bearing is held by the pressure of a nut 132 against the other bearing. This nut is threaded on a threaded part 134 of the spindle shaft and is retained by a jam nut 136. A flanged washer 138 having portions bent over the flats of the nuts to prevent relative rotation therebetween is located between the nuts 132 and 136. The nut 132 may be partially bored out as shown (FIG. 2) to clear a shoulder 140 on the spindle.

The follower block 126 is an irregularly shaped block having an outer surface of parti-cylindrical form. A sheet 144 of brass or bronze or other bearing material covers this outer surface and is wrapped around the block having a tongue 146 extending between the two rollers 148 on each block. The rollers 148 may be standard anti-friction bearings mounted on headed pins threaded or otherwise held in the block. They are spaced apart just far enough to straddle a cam ridge 150 formed on cam segment blocks 152 which are held in the stationary part 40 of the support for the machine. Thus, while the rollers straddle the cam ridge 150, of this drum cam, they will translate any change in the location of that ridge into longitudinal motion of the spindle. However, since the follower block is free to rotate on the spindle, it is necessary to have some means of holding it in a fixed position with the rollers engaging the ridge. This is accomplished by the engagement of the outer surface of the brass sheet 144 with the inner surface of the cover member 72 which are finished as a bearing surface for the follower blocks to slide on longitudinally. Because of their wide arcuate outer surface, the blocks are then restrained from turning about the spindles. Both the spindles 98 and the cover member 72 rotate about the center of the machine at the same speed. Therefore, the only motion between the cover 72 and the follower block is the longitudinal sliding induced by the cam.

Movement of the spindles 98 by the drum cam is effective to carry the spindle heads 124 toward and away from each other and thereby to drive a tool 154 (FIG. 5) through the blank and to pass it from one head to another. This movement may be modified to break chips formed by the tool in cutting material from the blank which may be desirable with certain classes of material, particularly when larger sizes of nuts are being threaded so that the chips will be of greater length which may cause jamming of the mechanism. This result is accomplished simply by offsetting certain of the cam segments 152 from the true line which the head would normally follow. This can be readily accomplished by grinding the cam to the desired feed with the segment 150 in a given relative position and then physically moving some of the segments in a direction which would cause a slight backing off of the tool cutting edge from the surface being cut, the overall result being an oscillation of the tool as the threads are cut, all as fully described in my aforesaid patent.

In FIGS. 1 and 2, the spindle head 124 is shown carried unsupported at the end of the spindle. This is a very satisfactory construction for work of light to moderate nature. However, for heavy work, the construction shown in FIGS. 3 and 4 may be desirable. In either case, the detailed construction of the head, as shown in FIG. 4, may be the same.

Figure 3:
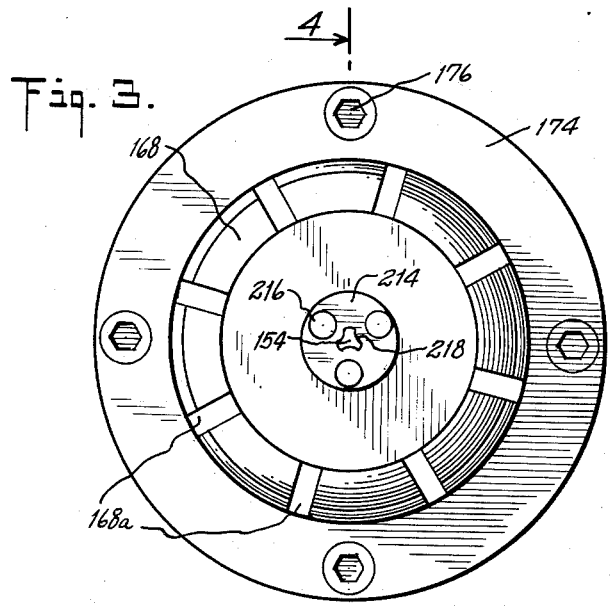
FIG. 3 is an end-elevational view of a tool holding head.
Figure 4:
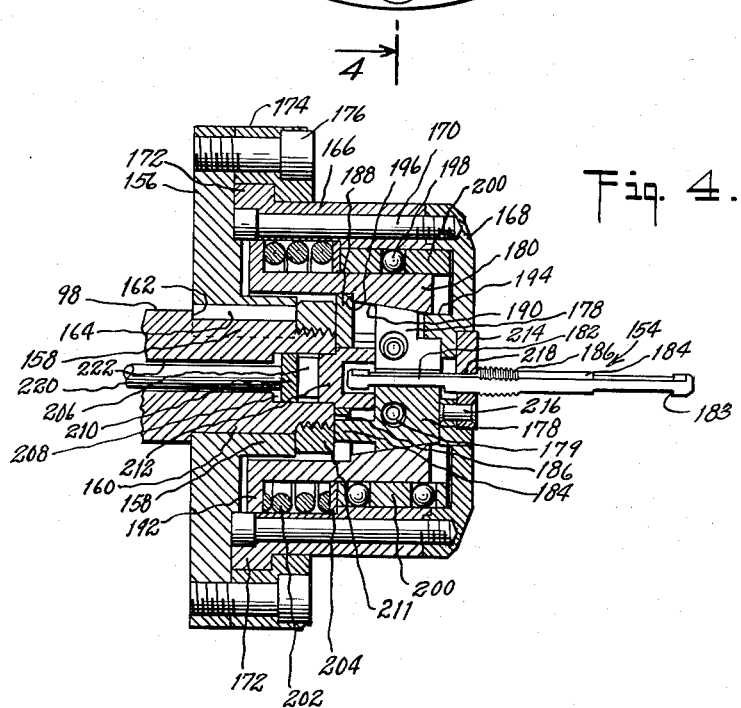
FIG. 4 is a sectional view on line 4—4 of FIG. 3.

In FIGS. 3 and 4 the spindle head 124 is illustrated as a housing in which the tool holding mechanism is located. The spindle 98 has attached to the inner end thereof a chuck drive disc 156. The chuck drive disc 156 has a hub 158 which is adapted to tightly embrace the end of the spindle 98, it being noted that the end 160 of the spindle has a reduced diameter resulting in a shoulder 162 against which the chuck drive disc 156 abuts when it is properly positioned on the end of the spindle. Relative rotation between the spindle 98 and the chuck drive disc 156 is avoided by a key 164.

The spindle head casing is composed of a chuck case 166 and a chuck cap 168. The chuck cap 168 is fixed to the chuck case 166 by a plurality of screws 170. A plurality of apertures 168a along the circumferential edge of the chuck cap 168 facilitate the flushing of chips and dirt from the spindle head casing. The chuck case 166 has a peripheral flange 172 which is adapted to rest against the outer face of the chuck drive disc 156 in which position it is maintained by a friction collar 174 which is rigidly attached to the chuck drive disc 156 by a plurality of screws 176. This method of attaching the chuck case to the chuck drive disc facilitates the rotational alignment of the spindle head on one side of the machine with its mate on the opposite side of the machine. Alignment can be perfected by rotating the chuck case into proper position before the screws 176 are driven down tightly to the point where the friction collar 174 exerts a clamping action on the peripheral flange 172 of the chuck case 166.

The shank of the tool 154 is engaged by a plurality of radially movable collet jaws 178 which are adapted for operation by a chuck collet 180.

In the specific embodiment illustration herein, there are three collet jaws which are normally urged into a spread or open position by means of a collet spring 179 which is disposed in a passage extending transversely through each of the collet jaws. Each of the collet jaws has a rearwardly extending finger 184 which projects into a slot 186 formed in a center disc 188.

The chuck collet 180 is an annular element having an internal inwardly inclined collet jaw engaging surface 190 at one thereof and an outwardly extending flange 192 at the other end thereof. The free edge of the flange 192 engages the inner surface of the chuck case upon which surface the flange is adapted to slide in a limited axial direction. The chuck collet 180 is further supported for axial movement by the center disc 188 and by a plurality of inwardly projecting surfaces 194 formed on the inner face of the chuck cap 168. Axial movement of the chuck collet 180 is limited in a rearward direction by an internal annular shoulder 196 formed at the junction of the inwardly inclined outer end of the chuck collet and the inner cylindrical portion thereof, which shoulder is adapted to abut the center disc 188.

The outer face of the chuck collet 180 is supported for axial movement by a plurality of anti-friction ball bearings 198 which are positioned by an annular ball bearing bushing 200, the bushing 200 being in tight contact with the inner surface of the chuck case 166 and a corresponding surface of the chuck cap 168. It can, therefore, be appreciated that the chuck collet 180 is supported for axial movement within the spindle head 124 and that the inwardly inclined surface 190 thereof in contact with the reversely inclined outer faces of the collet jaws 178 will force the collet jaws 178 inwardly into tool clamping position as the chuck collet 180 is retracted toward the left as viewed in FIG. 4. By the same token, the collet jaws 178 will be released from the influence of the chuck collet 180 as the chuck collet is projected to the right as viewed in FIG. 4.

The chuck collet 180 is normally biased toward the left such that the collet jaws 178 will be closed; the biasing force being provided by a chuck spring 202 which surrounds the chuck collet and which at one of its ends bears against the chuck collet flange 192 and at the other of its ends bears against a spring washer 204 which is disposed at the inner end of the ball bearing bushing 200.

The chuck collet 180 is operated to release the collet jaws 178 by moving the center disc 188 to the right. The center disc 188 has a pair of rearwardly extending walls 206 (only one shown in FIG. 4) which extend rearwardly into a socket 208 formed in the outer end of the spindle 98. The walls 206 are joined at their inner end by a transverse web 210 constituting an abutment for a chuck operating rod, to be described later herein. The inner face of the center disc 188 normally rests against a spindle nut 211, which is threaded to the outer end of the spindle 98 for the purpose of retaining the chuck drive disc 156 in place on the spindle 98. The center disc 188 is centrally recessed to accommodate a spider 212 which is tightly fitted into the mouth of the shaft recess 208. The aperture within the center disc 188 closely embraces axial surfaces of the spider 212 such that the spider 212 constitutes a slide bearing surface for the center disc 188.

The chuck cap 168 has fitted thereto a tool driver 214, the tool driver 214 being fixed within a chuck cap recess by means of a plurality of rivets 216. The tool driver 214 has a tool receiving opening 218 which is shaped to complement the drive portion of the shank of the tool 154.

The tool 154 is formed with two shanks 182 and 184 on the ends of a thread cutting portion 186. This thread cutting portion may be formed as any thread cutting tap. The shanks 182 and 184 may be formed symmetrically but preferably are formed as shown in the drawings. The tool, as viewed in FIG. 4, is initially supported by the right hand shank while it is inserted through the workpiece, is then gripped by the other head on the left hand shank. Both shanks are held during the cutting operation, after which the tool is carried solely by the left hand shank and is withdrawn completely from the workpiece which is then discharged, after which the tool is passed back so that the right hand shank is picked up and held as initially, the left hand shank being released. At each end, the tool has formed thereon an annular shoulder 183 which is adapted to overhang the inner edge of the collet jaws 178 and thus avoid premature withdrawal of the tool from the chuck.

The left hand shank 182 of the tool is formed in three different diameters; the first two being useful in holding and releasing the tool easily from the head as will appear later.

The tool 154 is released from the chuck by a chuck operating rod 220 (see also FIG. 2) extending through a central opening 222 in the spindle. When the chuck operating rod 222 is reciprocated forwardly within the spindle 98, the inner end thereof will bear against the web 210 of the center disc 188 with the result that the center disc 188 is urged forwardly. The contact established by the center disc 188 against the internal shoulder 196 of the chuck collet 180 will cause the chuck collet 180 to be driven forwardly against the resistance of the chuck spring 202. As the face 190 of the chuck collet 180 recedes from the collet jaws 178, the collet spring 179 will expand the collet jaws 178 and thereby free the tool 154 such that it can be withdrawn from the chuck as stated above. Retraction of the rod 220 with the resulting release of the center disc 188 will permit the chuck spring 202 to move the chuck collet 180 to the left in FIG. 4 such that the collet jaws 178 will be forced shut.

Movement of the rod 220 is induced by a cam and follower arrangement at the end of the spindle opposite from the head (FIG. 2). At this end, a collar 230 is formed on the rod to engage a small ball thrust bearing 232 held in a follower member 234. The follower member is freely journalled on the end of the spindle 98, so that it is carried by the spindle, but leaves the spindle free to rotate while the follower may be sliding longitudinally of the spindle. A roller 236 journalled in the member 234 engages a cam track 238 which extends into a slotted opening in the member 234. A spring 240 engaging the member 234 and the cover 122 urges the member 234 against the cam track 238, but in order to assure positive following by the follower, a radially extending roller 242 may be used engaging the surface of a second cam track 244. The tracks 238 and 244 may preferably be separate for ease of assembly.

In its operation, as explained heretofore, the machine in its preferred embodiment is driven with two motions. The shaft 32 carrying the bull gears 50 rotates in a direction such that the top of the gears are approaching the observer in all figures. The drum carrying the spindles and work holding device rotates in the opposite direction. The spindles assume eight essential positions during a cycle of operation, all as fully explained in my aforesaid patent.

It will be recognized that the number of spindles in a machine built according to my invention is not fixed, but that more or fewer could be used. If more spindles were used and the machine driven at the same rotational speed, the output would be proportionately faster. Thus it is possible with a multi-spindle machine to produce as many as 2500 nuts per minute as compared with present day production with conventional machines of from 50–100 nuts per minute. Moreover, the tool is no more expensive and perhaps less expensive than present day hook taps and, if made of suitable material, will last several times as long measured by the number of nuts produced per tap. This is true because of the complete lack of undesired relative motion between the tap and the nut blank, and because the use of fine fast cutting materials is feasible only with such a small tool. Thus my invention makes possible not only a greater production, but the upkeep cost, so far as tools go, is considerably less.

Figure 5:
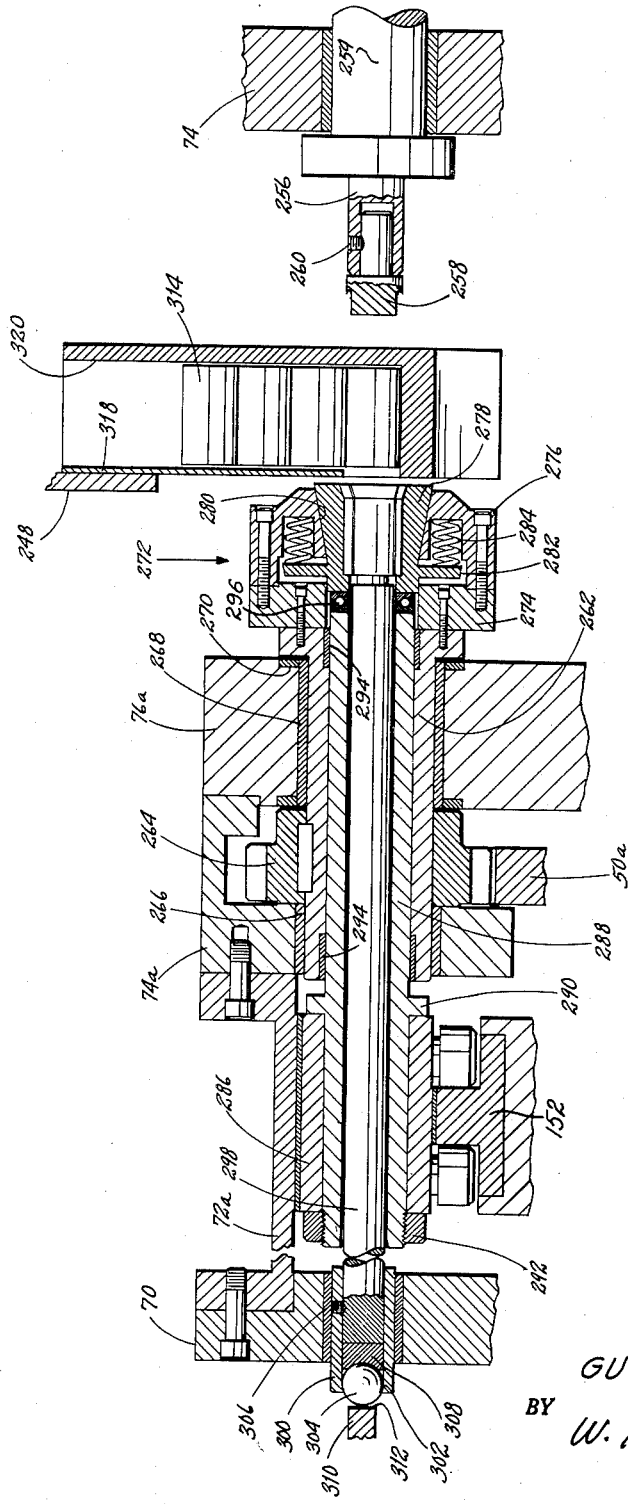
FIG. 5 is a longitudinal sectional view through an alternative form of spindle and workpiece injector.

An embodiment of my machine capable of counterboring a hole in a fitting and at the same time rounding the edges and perhaps trimming the outer diameter somewhat, along with a novel type of feeding device useful in both this embodiment and that last described is disclosed in FIGS. 5–7.

In this embodiment, the spindles are not symmetrical on the two sides. The left hand spindle does not move longitudinally while the right hand spindle moves longitudinally but does not rotate. The left hand head is formed with a collet which receives the workpiece and holds it securely. The head including the collet is rotated, while the tool holding head moves toward the workpiece to the desired point and then recedes, whereupon the collet opens and the product is discharged.

More specifically, the right hand spindle 254 is held from rotating by any well known means, such as a key or spline, but is slidably journalled in the main drum of the machine. Longitudinal movement of the spindle 254 may conveniently be controlled by a drum cam similar to those previously described. At its working end, the spindle 254 carries a head 256 in which a tool bit 258 is fixed by a set screw 260 or other convenient means.

The left hand spindle and head are also formed differently, although the basic structure of the drum is changed only in minor detail. The rotating part of the spindle is in the form of a sleeve 262 to which is keyed a pinion 264. The pinion 264 meshes with a sun gear 50a similar to the bull gears 50 of FIGS. 1 and 2, except that here the gear need not be so wide, for there is no longitudinal movement of the pinions with which it is in mesh. The sleeve 262 may be journalled in simple bearings 266 and 268 in the end wall 76a and spindle support member 74a. Thrust faces 270 may be provided in one of the bearings to resist the thrust loading on the head 272. It will be apparent that the simple bearings could in all cases be replaced by appropriate ball or roller anti-friction bearings.

The head 272 is comprised of two principal pieces, a plate member 274 bolted to the sleeve 262 and a cover member 276 which in turn is bolted to the plate 274. A collet which may be formed of four jaws 278 is disposed in the cover member. The jaws 278 have sloping outer surfaces to match a conical sloped opening 280 in the cover. Thus the collet is formed to open as the jaws are moved outwardly. An ear 282 is provided on each jaw 278, and is engaged by a spring 284 which tends to force the jaw inwardly and thus to close the collet to its normal, closed position.

The collet is opened to admit a workpiece or to discharge one by action of the drum cam ridges 152 on a follower block 286 fixed to a tubular shaft 288. Since the shaft 288 need not rotate, the follower block 286 may be clamped to the shaft between a collar 290 and a nut 292 to preserve its fixed position. Bearing inserts 294 are provided between the spindle 262 and the shaft 288 so that the spindle may rotate freely. Since the shaft 288 is stationary and must push open the rotating collet, a thrust bearing 296 is provided between the end of the shaft and the jaws 278 of the collet. It is apparent that movement of the shaft because of the cam action will be effective to move the jaws against the force of the springs 284 and cause them to open.

Slidably disposed within the tubular shaft 288 is a rod 298 adapted to eject the product from the collet. This rod may be controlled by a cam and follower arrangement exactly similar to that used in the originally described embodiment. An alternative type of follower is illustrated in FIG. 5. A sleeve 300, having a flange 302 at one end formed to retain a ball 304, fits over the end of the rod 298 and is held in place by a setscrew 306. A bearing member 308 formed to fit the ball 304 is retained between the ball and the end of the rod 298, thus acting as a thrust bearing therebetween. A cam track 310 having the surface 312 shaped to provide the desired movement is fastened to the wall of the standard 14. It will be recognized that, since the cam need be operative to slide the rod within the shaft only to eject a piece, the cam 310 need extend for only a short distance where that action is required. For the rest of the travel of the spindle, the rod 298 may simply be carried by the shaft 288 and by the end plate 70 in which it may conveniently be journalled. After the product is ejected, the rod will be moved back to its original position by the new workpiece as it is inserted into the collet. It will be obvious to those skilled in the art that a similar follower and cam could be used in the originally described nut threading embodiment to control the ejection of the tool 154 from its head 124 by the central rod 220 (FIG. 2).

The means for injecting the workpiece into the collet is shown in FIGS. 5–7 where the workpieces 314 are contained within a vertical channel member 316, one wall of which may be formed by a plate 318. The channel member may conveniently be attached to the support 248, previously described. A channel 320 in the member 316 extends vertically to a point where the lowest workpiece is directly in line with the opening in the collet as it passes. At this point, the channel 320 communicates with an arcuate channel 322 (FIG. 7) formed in a chute member 324. The channel 322 is open at the face adjacent the head 272 so that a workpiece 314 may pass longitudinally from the channel 322 into the collet.

The collet in this embodiment is carried in a circular path by the drum member and, therefore, along beside the open face of the channel 322. As it does so, means are provided to slide the workpiece 314 down the channel in line with the head and to slide it longitudinally out of the channel and into the collet. This longitudinal motion is induced by the camming action of a pair of slanting ledge-like surfaces 326 formed in the upper and lower walls 328 and 330, the edges of which engage the ends of the workpieces. These surfaces extend diagonally across the channel 322 and are of a thickness approximately equal to the wall thickness of the workpiece and slope diagonally from the wall furthest from the collet to the opening in the wall 318. While I have shown the slope as a straight line (FIG. 7), it might be desirable to use an accelerating slope, the exact shape of the surface forming no part of my invention.

In order to move the workpiece along the ledge-like surfaces 326 to be cammed into the collet thereby, a pickup arm 332 is fixed to the end wall 76a. The arm extends outwardly from the wall and over the head 272. It will be remembered that in this embodiment, the head 272 does not move outwardly and, therefore, the arm may be in a fixed position. The end surface 334 of this arm is adapted to engage the workpiece, and is parallel to and at a fixed distance from the axis of the collet. A slot 336 is provided in the wall of the member 316 opposite the channel 322 so that the arm may pass through the slot, pick up a workpiece and by sliding it along the cam surface 326, inject it into the collet.

While the fundamentally novel features of the invention have been illustrated and described in connection with specific embodiments of the invention, it is believed that these embodiments will enable others skilled in the art to apply the principles of the invention in forms departing from the exemplary embodiments herein, and such departures are contemplated by the claims.

I claim:

1. In a metal working machine having a rotary spindle, chuck mechanism carried at one end of said spindle, a chuck collet having an inclined bearing surface adapted to support a plurality of gripping jaws within said chuck mechanism, a plurality of gripping jaws having a surface reversely inclined to said chuck collet surface in contact with said chuck collet surface, spring means for reciprocating said chuck collet and said jaws in respect to each other whereby said jaws are normally urged into gripping relationship, a chuck operating member disposed coaxially within said spindle and in operative relationship to said spring means, and means for periodically operating said chuck operating means in opposition to said spring means whereby said spring means is moved to release said gripping jaws.

2. In a metal working machine having a rotary spindle, chuck mechanism carried at one end of said spindle, a chuck collet having an inclined bearing surface adapted to support a plurality of gripping jaws within said chuck mechanism, a plurality of gripping jaws having a surface reversely inclined to said chuck collet surface in contact with said chuck collet surface, spring means for reciprocating said chuck collet and said jaws in respect to each other whereby said jaws are normally urged into gripping relationship, a chuck operating member disposed coaxially within said spindle and in operative relationship to said spring means, and cam means for periodically operating said chuck operating means in opposition to said spring means whereby said spring means is moved to release said gripping jaws.

3. In a metal working machine having a rotary spindle mounted in a turret for bodily rotation about an axis in each work cycle, chuck mechanism carried at one end of said spindle, a chuck collet having an inclined bearing surface adapted to support a plurality of gripping jaws within said chuck mechanism, a plurality of gripping jaws having a surface reversely inclined to said chuck collet surface in contact with said chuck collet surface, spring means for reciprocating said chuck collet and said jaws in respect to each other whereby said jaws are normally urged into gripping relationship, a chuck operating member disposed coaxially within said spindle and in operative relationship to said spring means, and stationary cam means for periodically operating said chuck operating means in opposition to said spring means whereby said spring means is moved to release said gripping jaws.

4. In a metal working machine having a rotary spindle, chuck mechanism carried at one end of said spindle, a reciprocating chuck collet having an inclined bearing surface adapted to support a plurality of gripping jaws within said chuck mechanism, a plurality of gripping jaws having a surface reversely inclined to said chuck collet surface in contact with said chuck collet surface, a radial flange on said chuck collet, a spring bearing against said radial flange for reciprocating said chuck collet in respect to said jaws whereby said jaws are normally urged to gripping relationship, a chuck operating rod disposed coaxially within said spindle and in operative relationship to said spring means, and means for periodically operating said chuck operating rod in opposition to said spring means whereby said spring means is moved to release said gripping jaws.

5. In a metal working machine having a rotary spindle, chuck mechanism carried at one end of said spindle, a reciprocating chuck collet having an inclined bearing surface adapted to support a plurality of gripping jaws within said chuck mechanism, a plurality of gripping jaws having a surface reversely inclined to said chuck collet surface in contact with said chuck collet surface, a radial flange on said chuck collet, a spring bearing against said radial flange for reciprocating said chuck collet in respect to said jaws whereby said jaws are normally urged into gripping relationship, a chuck operating rod disposed coaxially within said spindle and in operative relationship to said spring means, and cam means for periodically operating said chuck operating rod in opposition to said spring means whereby said spring means is moved to release said gripping jaws.

6. In a metal working machine having a rotary spindle mounted in a turret for bodily rotation about an axis in each work cycle, chuck mechanism carried at one end of said spindle, a reciprocating chuck collet having an inclined bearing surface adapted to support a plurality of gripping jaws within said chuck mechanism, a plurality of gripping jaws having a surface reversely inclined to said chuck collet surface in contact with said chuck collet surface, a radial flange on said chuck collet, a spring bearing against said radial flange for reciprocating said chuck collet in respect to said jaws whereby said jaws are normally urged into gripping relationship, a chuck operating rod disposed coaxially within said spindle and in operative relationship to said spring means, and stationary cam means for periodically operating said chuck operating rod in opposition to said spring means whereby said spring means is moved to release said gripping jaws.

7. In a metal working machine having a rotary spindle, chuck mechanism carried at one end of said spindle, a chuck collet having an inclined bearing surface adapted to support a plurality of gripping jaws within said chuck mechanism, a plurality of gripping jaws having a surface reversely inclined to said chuck collet surface in contact with said chuck collet surface, a radial flange on said gripping jaws, a spring bearing on said radial flange for reciprocating said jaws in respect to said chuck collet whereby said jaws are normally urged into gripping relationship, a chuck operating member disposed coaxially within said spindle and in operative relationship to said spring means, and means for periodically operating said chuck operating means in opposition to said spring means whereby said spring means is moved to release said gripping jaws.

8. In a metal working machine having a rotary spindle, chuck mechanism carried at one end of said spindle, a chuck collet having an inclined bearing surface adapted to support a plurality of gripping jaws within said chuck mechanism, a plurality of gripping jaws having a surface reversely inclined to said chuck collet surface in contact with said chuck collet surface, a radial flange on said gripping jaws, a spring bearing on said radial flange for reciprocating said jaws in respect to said chuck whereby said jaws are normally urged into gripping relationship, a chuck operating member disposed coaxially within said spindle and in operative relationship to said spring means, and cam means for periodically operating said chuck operating means in opposition to said spring means whereby said spring means is moved to release said gripping jaws.

9. In a metal working machine having a rotary spindle mounted in a turret for bodily rotation about an axis in each work cycle, chuck mechanism carried at one end of said spindle, a chuck collet having an inclined bearing surface adapted to support a plurality of gripping jaws within said chuck mechanism, a plurality of gripping jaws having a surface reversely inclined to said chuck collet surface in contact with said chuck collet surface, a radial flange on said gripping jaws, a spring bearing on said radial flange for reciprocating said jaws in respect to said chuck collet whereby said jaws are normally urged into gripping relationship, a chuck operating member disposed coaxially within said spindle and in operative relationship to said spring means, and stationary cam means for periodically operating said chuck operating means in opposition to said spring means whereby said spring means is moved to release said gripping jaws.

10. In a metal working machine having a rotary spindle drum, a rotary spindle carried by said drum, chuck mechanism carried at one end of said spindle, a plurality of gripping jaws in said chuck mechanism, spring means for normally urging said gripping jaws toward each other into gripping relationship, a chuck operating member disposed co-axially with respect to said spindle and in operative relationship to said spring means, and stationary cam means separate from said spindle drum engaged by said chuck operating means during rotation of said spindle drum for periodically operating said chuck operating means in opposition to said spring means whereby said spring means is moved to release said gripping jaws.

11. In a metal working machine having a rotary spindle drum, a rotary spindle carried by said drum, chuck mechanism carried at one end of said spindle, a plurality of gripping jaws in said chuck mechanism, spring means for normally urging said gripping jaws toward each other into gripping relationship, a reciprocating chuck operating member disposed co-axially within said spindle and in operative relationship to said spring means, and stationary cam means separate from said spindle drum engaged by said chuck operating means during rotation of said spindle drum for periodically reciprocating said chuck operating means in opposition to said spring means whereby said spring means is moved to release said gripping jaws.

References Cited in the file of this patent

UNITED STATES PATENTS

| | | |
|---|---|---|
| 1,367,542 | Ferris | Feb. 8, 1921 |
| 2,359,939 | Reynolds | Oct. 10, 1944 |
| 2,477,600 | Hammond | Aug. 2, 1949 |
| 2,504,186 | De Munck | Apr. 18, 1950 |
| 2,597,712 | Drissner | May 20, 1952 |
| 2,698,754 | Bernstein | Jan. 4, 1955 |
| 2,708,117 | Flory | May 10, 1955 |